United States Patent
Spencer et al.

(10) Patent No.: US 6,349,299 B1
(45) Date of Patent: Feb. 19, 2002

(54) SYSTEM AND METHOD FOR STORING ELECTRONIC CONTACT INFORMATION INTO AN ELECTRONIC ADDRESS BOOK

(75) Inventors: Eric W. Spencer, Somerville; Harold L. Shubin, Belmont, both of MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/323,029

(22) Filed: Jun. 1, 1999

Related U.S. Application Data (60) Provisional application No. 60/113,942, filed on Dec. 24, 1998.

(51) Int. Cl.[7] .............................................. G06F 17/30
(52) U.S. Cl. ........................................ 707/10; 707/104
(58) Field of Search ................................ 707/1, 2, 4, 6, 707/8, 9, 10, 104; 705/26; 704/9; 345/338

(56) References Cited

U.S. PATENT DOCUMENTS

| | | | | |
|---|---|---|---|---|
| 5,845,081 A | * | 12/1998 | Ranjarajan et al. | 709/224 |
| 5,909,681 A | * | 1/1999 | Passera et al. | 707/8 |
| 6,216,127 B1 | * | 4/2001 | Gans et al. | 707/10 |
| 6,232,970 B1 | * | 5/2001 | Bodnar et al. | 345/338 |
| 6,236,985 B1 | * | 5/2001 | Aggarwal et al. | 707/2 |

OTHER PUBLICATIONS (IEEE publication) Graphical applications over the wireless web: Japan set the pace by Michael Potel, pp. 9–15, (IEEE Computer Graphics and Applications (2001).*

* cited by examiner

*Primary Examiner*—Diane Mizrahi
(74) *Attorney, Agent, or Firm*—Mintz Levin Cohn Ferris Glovsky and Popeo, PC (57) ABSTRACT

A system, method, and computer readable medium containing computer readable instructions for causing a computer to parse selected electronic contact information into fields of a record for storage in a contact database for use by an electronic address book program without opening the electronic address book module. The system may include a selection module that permits a user to select electronic contact information, an initiation module that enables a user to initiate parsing of the selected electronic contact information into fields of a record for storage in the contact database, a parsing module that parses the electronic contact information into fields of a record in a format for storage in the contact database, and a storage module that stores a record from the fields assigned by the parsing module in the contact database. The selection module and the initiation module may operate through operation of a select and click combination through use of a computer mouse and selection of a computer screen icon presented to the user by the system.

17 Claims, 9 Drawing Sheets

```
ARRAY OF FIELD VALUES
ADAM B. CONROY  PHONE: (999) 555-1111
ABC INCORPORATED
102 ABEE SEA LANE
SUITE 102
ABEE SEA
CALIFORNIA  99999
adam_conroy@abcinc.com
http:\\www.abcinc.com
FAX: (999) 555-1112
OFFICE HOURS: M-F FROM 9-6 P.M.
```

FIG. 5A

```
ARRAY OF FIELD VALUES
ADAM B. CONROY
ABC INCORPORATED
102 ABEE SEA LANE
SUITE 102
ABEE SEA
CALIFORNIA  99999
adam_conroy@abcinc.com
http:\\www.abcinc.com
OFFICE HOURS: M-F FROM 9-6 P.M.

EXTRACTED FIELD VALUES
TEL. 1: (999) 555-1111
FAX:    (999) 555-1112
```

FIG. 5B

ARRAY OF FIELD VALUES
ADAM B. CONROY
ABC INCORPORATED
102 ABEE SEA LANE
SUITE 102
ABEE SEA
CALIFORNIA
99999
adam_conroy@abcinc.com
http:\\www.abcinc.com
OFFICE HOURS: M-F FROM 9-6 P.M.

EXTRACTED FIELD VALUES
TEL. 1: (999) 555-1111
FAX:    (999) 555-1112

FIG. 5C

ARRAY OF FIELD VALUES
ADAM B. CONROY
ABC INCORPORATED
102 ABEE SEA LANE
SUITE 102
ABEE SEA
CALIFORNIA
99999
OFFICE HOURS: M-F FROM 9-6 P.M.

EXTRACTED FIELD VALUES
TEL. 1: (999) 555-1111
FAX:    (999) 555-1112
E-MAIL: adam_conroy@abcinc.com
WEB: http:\\www.abcinc.com

FIG. 5D

ARRAY OF FIELD VALUES
ADAM B. CONROY
ABC INCORPORATED
102 ABEE SEA LANE
SUITE 102
ABEE SEA
CALIFORNIA
99999

EXTRACTED FIELD VALUES
TEL. 1: (999) 555-1111
FAX:   (999) 555-1112
E-MAIL: adam_conroy@abcinc.com
WEB: http:\\www.abcinc.com
NOTES: OFFICE HOURS: M-F FROM 9-6 P.M.

SYSTEM AND METHOD FOR STORING ELECTRONIC CONTACT INFORMATION INTO AN ELECTRONIC ADDRESS BOOK

This application claims benefit of Provisional No. 60/113,942 filed Dec. 24, 1998.

FIELD OF THE INVENTION

This invention relates to a system for storing selected electronic contact information in an electronic address book database.

BACKGROUND OF THE INVENTION

Electronic address book software programs have become popular tools for allowing people to keep track of information about contacts. Electronic address book programs may be a stand-alone product, or part of a computer implemented personal information manager or other program. Electronic address book programs may be implemented, for example, on specially designed portable electronic devices, notebook computers, lap-top computers, stand-alone personal computer systems, network terminals, or other electronic devices.

Current electronic address book programs generally use one or more databases to store records for various contacts. Information about each contact may then be stored in a record for that contact within one or more databases. Each record may include various fields of information such as work and home addresses, phone numbers, facsimile numbers, electronic mail addresses, and web site addresses, as well as other information about that contact. An interface program may be provided to allow a user to view, modify and create records of the address book database.

In at least some existing systems, when a user receives new contact information and desires to enter that information into an electronic address book, the user must open the electronic address book interface program, manually enter the contact information, and store that record in a database for the electronic address book.

In at least some cases, the new contact information may be available to the user in electronic format. For example, a user may receive contact information via electronic mail, through an internet web browser or in some other electronic format. Current systems nonetheless require the user to either type information into appropriate fields through the electronic address book interface program or perform multiple cut and paste operations to select, cut and paste various portions of the electronic contact information into appropriate fields within the record of the electronic address book database. The multiple cut and paste operations are time-consuming and a user may be required to cut from and paste to numerous fields.

Additionally, users may not have the electronic address book program open at all times in an effort to conserve operating system resources. Nonetheless, current systems require the user to open the electronic address book interface program, wait for the program to be opened, and then create or modify a record through the interface program. The electronic address book interface program stores accesses a database to create and store the record. Other drawbacks also exist with current systems.

SUMMARY OF THE INVENTION

Accordingly, one object of the present invention is to overcome these and other drawbacks of current electronic address book systems.

Another object of the present invention is to provide a system, method, and computer readable medium for facilitating entry of contact information into an electronic address book.

Another object of the present invention is to provide a system, method, and computer readable medium for causing a computer to store selected electronic contact information into a record of an electronic address book program database.

Another object of the present invention is to provide a system, method, and computer readable medium for causing a computer to enable a user to select electronic contact information and store that information in an electronic address book in response to an execution.

Another object of the present invention is to provide a system, method, and computer readable medium for causing a computer to store contact information into an electronic address book database without requiring that the electronic address book interface program be opened.

Another object of the present invention is to provide a system, method, and computer readable medium for causing a computer to store contact information in an electronic address book database directly from selected electronic contact information.

Another object of the present invention is to provide a system, method, and computer readable medium for causing a computer to store contact information from electronic contact information without requiring that the contact information be retyped into the system or multiple cut and past operations be performed.

These and other objects of the present invention are accomplished according to various embodiments of the present invention. According to one embodiment of the present invention, a system, method, and computer readable medium containing computer readable instructions for causing a computer to parse selected electronic contact information into fields of a record for storage in a contact database for use by an electronic address book programs are provided. The system may comprise a selection module that permits a user to select electronic contact information presented on a computer screen by a user application program such as by highlighting electronic information, for example. Once electronic contact information has been selected, the user may initiate parsing of the selected electronic contact information into fields of a record for storage in the contact database such as by selecting a key or mouse button, for example.

Upon receipt of the initiation operation by the user, a menu system may be presented to enable the user to select information about the destination for the selected electronic information, such as the database name, for example. Once the destination has been determined, a parsing module operates and begins parsing the electronic contact information. Various portions of that selected electronic contact information may be assigned to fields of a record in a format for storage in the contact database. After the fields of the record have been parsed, a verification screen may be presented to the user. The verification screen may display the field assignments and enable the user to verify, modify or cancel the request.

If the user verifies and accepts the assignments, the assigned information is then stored through a storage module that creates and stores a record from the fields assigned by the parsing module in the contact database. The storage module may be separate from the electronic address book interface program so that the contact database may be opened and a record stored therein without requiring that the electronic address book interface program be opened by the system.

Other advantages of the present invention will be apparent from reviewing the detailed description and drawings of the present invention set forth herein.

DETAILED DESCRIPTION OF THE PRESENT INVENTION

According to one embodiment of the present invention, a system, method and computer medium is provided for facilitating storage of selected electronic contact information into a record of an electronic address book database. The system may provide an electronic address book interface program that allows a user to view contents of the database in a number of different views, as well as to enable the user to modify and create records in the database. The present invention provides a system that enables a user to select electronic contact information, have that information parsed into fields of the database in which it is to be stored, and then stored in an electronic address book database, all without opening the electronic address book interface program. This may be accomplished by providing a storage module that is separate from the electronic address book interface program to create and store a record.

As used herein, the term electronic contract information should be understood to comprise a collection of data storable in an electronic format. Such electronic contact information may include, for example, text, characters, images, executables, bitmaps, hypertext links, pictures, files, drawings, files, pointers, arrays or any other form of data that may be selected. Accordingly, one embodiment of the present invention enables a user to select storable data and store that data directly into a database.

Figure 2:
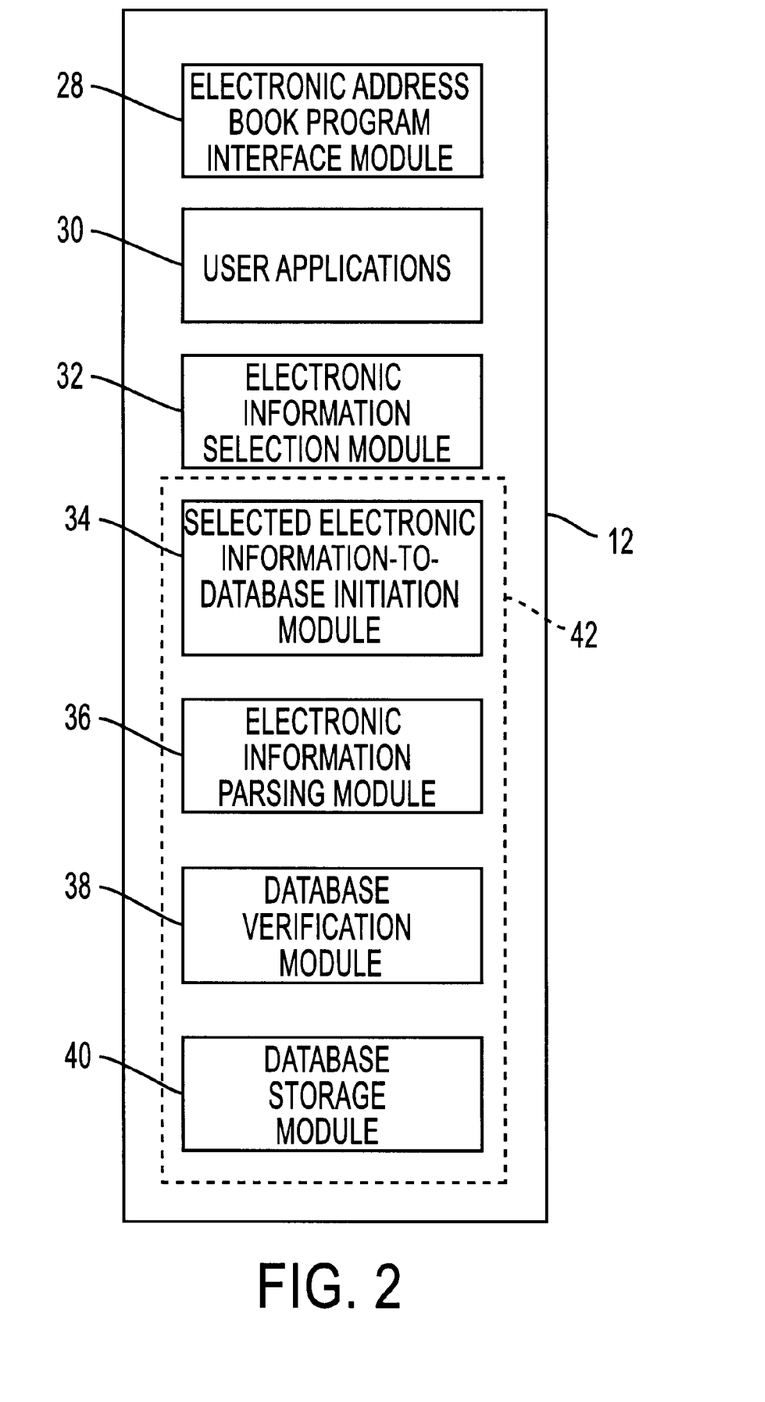
FIG. 2 depicts a user system according to one embodiment of the present invention.
Figure 3:
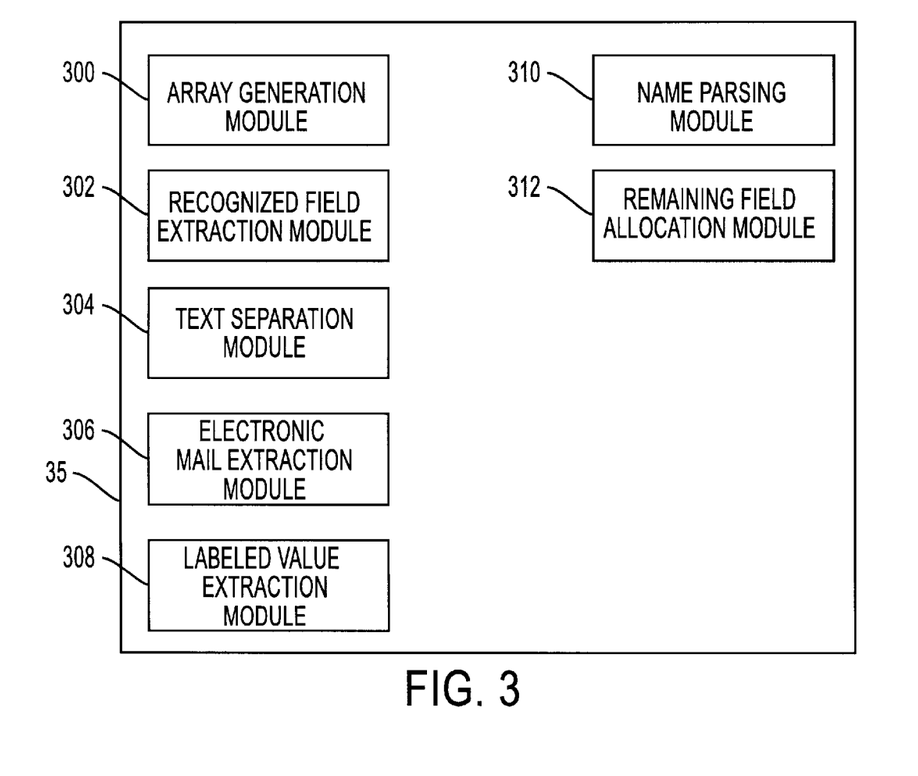
FIG. 3 depicts a parsing module according to one embodiment of the present invention.

A method of parsing selected electronic information into a record according to one embodiment of the present invention may be described with reference to FIGS. 1. Additionally, a user system 12, as depicted in FIGS. 2 and 3, according to one embodiment of the present invention may be provided for performing the functions depicted in FIG. 1. User system 12 may comprise a plurality of modules including an electronic address book interface module 28, one or more user application modules 30, an electronic information selection module 32, an electronic information-to-database initiation module 34, an electronic information parsing module 36, a database verification module 38, and a database storage module 40. The operation of these modules may be better understood with respect to the method of FIG. 1.

Method 100 comprises multiple steps that may be performed for parsing electronic information into fields of a record for an electronic address book database. A user may select electronic information through electronic information module 32 by known methods of selecting electronic information, for example.

Once a user has selected electronic contact information in step 102, in step 104, an array of field values may be generated from the selected electronic contact information. The array of field values may be generated by searching for one or more characters to parse words or phrases into separate field values. According to one embodiment of the present invention, the array of field values may be generated by splitting the selected electronic contact information into fields separated by any one of the following: a linefeed, tab, semicolon, or comma. Other characters, data or elements of the selected electronic contact information may also be used to split the selected electronic contact information into an array of field values. Other methods of generating an array of field values from selected electronic contact information may also be used.

Some types of data within the selected electronic contact information, such as images, bit maps, and hypertext links, for example, may be either deleted or moved into a separate portion of the array of field values. For example, some types of data may be desirably placed into a completely separate section of field values that may then be stored in a separate portion of the electronic address book database, such as bit maps, images, executables, hypertext, and any other non-text type data. Other systems, however, may preferably provide an option to store non-text data. Accordingly, this data, such as company icons, pictures, hypertext links, and the like may be selected and stored with that contact's name and address. Such logos, icons or pictures may preferably be stored in the electronic address book database and may therefore be extracted in step 104 into a separate array of field values for image type data.

In addition, in step 104, blank lines and extra white space in the generated array of field values may be deleted. According to one embodiment, array generating module 300 of electronic information parsing module 36 may be responsible for performing step 104.

After an array of field values has been created in step 104, in step 106 fields with recognizable labels or prefixes may be extracted from the array of field values. The recognized field labels or prefixes may comprise one or more of the following: telephone, phone, tel, voice, extension, ext, extn, facsimile, fax, e-mail, or email. Other labels or prefixes may also be recognizable. Text and character recognition methods are well known and any such method may be used to search for and identify those field labels or prefixes.

Upon recognition of one or more of the predefined labels, all information within the field value for that label may be extracted from the array of field values and placed into a predetermined field value. Placement of information into field values may be programmed as part of electronic information parsing module 36. For each recognizable label or prefix searched by electronic information parsing module 36, a field value in the record of the electronic address book database may be assigned by the system or may be modified by the user to meet the user's particular needs. According to one embodiment, recognized field extraction module 302 may be responsible for performing the functions provided in step 106.

Next, the remaining information in the array of field values may be separated into field values in step 108. According to one embodiment, step 108 may involve implementing additional or other rules such as splitting field values into two or more separate field values when two or more spaces are detected within a field value. Step 108 is preferably performed after step 106 because many recognizable labels or prefixes may have two or more spaces separating a label from the corresponding value. For example, the selected electronic contact information may contain the text "phone: _ _ (999) 555-1212" with two spaces between the colon and the phone number. Accordingly, step 108, when performed after step 106, does not separate the recognizable label or prefix from the corresponding value. According to one embodiment of the present invention, step 108 may be performed by text separation module 304.

In step 110, electronic mail addresses may be parsed from the array of field values. According to one embodiment of the present invention, electronic mail address extraction may be performed by searching for the @ character within the array of field values. A field value having an @ character therein may be extracted from the array of field values and placed into the email field value of a record for the database. In addition, in step 110, an internet page address may be parsed. According to this embodiment, the system may search for the term ":\\" for example. Other characters or data may also be used to parse internet address information from the array of field values. According to one embodiment, step 110 may be performed by electronic mail extraction module 306.

After electronic mail addresses and internet addresses have been extracted from the array of field values, in step 112, additional unrecognized labeled values may be parsed. For example, field values containing a colon may be extracted and placed into a predetermined field, such as a "notes" field in the database. Step 112 may be performed by a labeled value extraction module 308 according to one embodiment of the present invention.

In step 114, name information provided in the record may be parsed according to a method described in more detail below with respect to FIG. 6. Step 114 may be performed by name parsing module 310.

Next, in step 116, the remaining information in the array of field values may be assigned to a field in the record for the database into which the information is to be stored. According to one embodiment of the present invention, the remaining field values may be assigned according to a predefined order to fields from the record from the electronic address book database. For example, the remaining fields may be assigned to fields corresponding to job title, company name, street, city, state, zip, and country, in that order. Other predefined fields or orders may also be provided. According to one embodiment, remaining field allocation module 312 may perform the functions provided in step 116.

According to one embodiment of the present invention, a user may modify the predefined fields for step 116 through database verification module 38. For example, different countries use different address formats. In the United States, addresses are normally given by name, street, city, state and zip code (in that order). In other countries, other address formats may be used. For example, in Republic of Congo, addresses are typically given as country, state, city, street, last name, first name and title. Therefore, assignment of the remaining field values may be modified to better correspond to the correct order of addresses for the country of the user based on the country format selected. Database verification module 38 may therefore provide a device for enabling a user to select the country format to be used in step 116. One embodiment is depicted with reference to FIG. 7, but other devices for selecting the country format may also be used.

Additionally, different address formats may provide for one or more lines for the street address. For example, a contact's street address may involve the name of a street and a suite or apartment number, multiple street labels, or a description of a crossroads requiring entry of two or more streets. Furthermore, room numbers within a building may also be provided. Accordingly, database verification module 38 may also provide a device that allows a user to select the number of lines permitted for the street field. Any number between 1 and 5 lines may preferably be used, although any number of lines of street address may be provided. One example is depicted with reference to FIG. 7. Other mechanisms for enabling selection of the number of lines to provide in the street field may also be used.

In step 118, a user interface may be presented to the user that presents all of the information to be stored in the database based on the parsing performed in the prior steps. That user interface may comprise a portion of data verification module 40. In step 120, the user is provided an opportunity to modify the allocated information via a graphical user interface or accept and verify assignment of the electronic information to fields of the contact database. In step 122, a record is then created and stored in the database using the modified information from the user.

Figure 7:
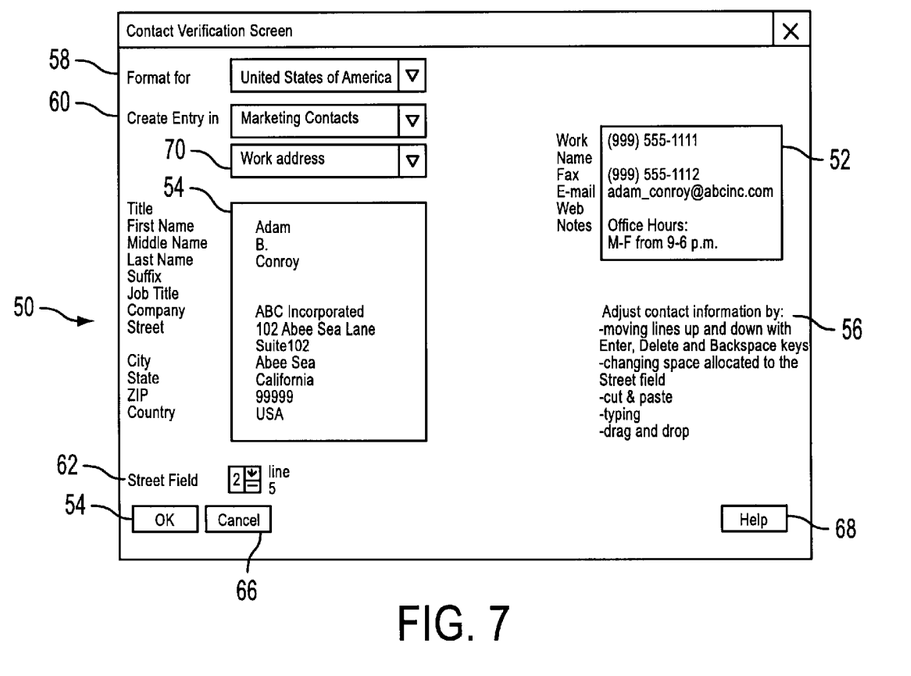
FIG. 7 depicts contact verification screen according to one embodiment of the present invention.

Electronic address book interface module 28 may operate independently of the other modules to provide users access to contact information stored in one or more contact databases. Electronic address book interface module 28 may comprise any electronic address book program, portion thereof, or portion of a computerized personal information system that enables a user to track information about contacts and may operate on user system 12. Electronic address book interface module 28 may store contact information in records in one or more databases and may present that contact information to a user. For a given electronic address book interface module 28, each record may have the same predetermined fields into which contact information may be entered. For example, a contact record in a database may comprise fields for a contact's name, work and home addresses, work and home telephone numbers and facsimile numbers, work and home electronic mail addresses and a general field for inputting other information about the user. Other fields may also be provided, for example, as depicted in FIG. 7. Further, electronic address book interface module 28 may present a graphical user interface on user system 12 for allowing a user to input information into those fields to view, create or modify a record stored in the one or more databases.

According to one embodiment of the present invention, user applications module 30 may comprise one or more computer software applications such as a data processing application, a spreadsheet application, an electronic mail message forwarding and receiving application, an internet browser application, an electronic database search application, an electronic calendaring application or other module operable on a computer system and, in particular, may comprise any other module that enables presentation or entry of electronic information. In addition, any module depicted herein may comprise a portion of any user application module 30.

Electronic information selection module 32 may comprise any system for selecting electronic information as are well known in the art. For example, the Windows™ operating systems permits selection of electronic information in applications designed for that operating system. Electronic information selection module 32 may incorporate any selection mechanism including a mouse, pen, keyboard, touch screen, voice response, or other mechanisms that allow a user to select information presented to a user. Such mechanisms may highlight information in a graphical user interface, for example, so a user may be able to see what is being selected. Other mechanisms for assisting a user to select electronic information may also be provided in electronic information selection module 32.

Electronic information-to-database initiation module 34 may comprise a module that, upon selection, initiates the parsing of text into database information. According to one embodiment of the present invention, electronic information-to-database initiation module 34 may be activated through selection by the user of an icon presented to the user on a graphical user interface on computer system 12. One embodiment is described with respect to FIG. 4. A drag-and-drop operation may also be provided by electronic information-to-database initiation module 34. According to another embodiment electronic information-to-database initiation module 34 may be activated by, for example, a computer mouse, computer pen, touch screen interface, keyboard or voice response system or other executable mechanism, for example.

Electronic information-to-database initiation module 34 may present a menu to the user in response to the initiation step that comprises one or more options including, for example, an option to create a contact, create an appointment, create a task, create a notepad page, adjust preferences in electronic information-to-database initiation module 34, or to initiate opening electronic address book interface module 28.

If a user selects "create an appointment" as the option through electronic information-to-database initiation module 34, the selected electronic contact information may be automatically placed into a record of an appointment database. In such an embodiment, an appointment verification graphical user interface may be presented to the user to permit the user to select the time and date of an appointment with the electronic information selected being provided in a note field within the appointment graphical user interface. If the user selects "create a task," the electronic information may be automatically placed in a field associated with a task within the electronic database program. Similarly, if a user selects "create a notepad page," the electronic information may be automatically placed in a notepad database record within the electronic address book program.

With the "create a task," "create a notepad page," and "create an appointment" options, a graphical user interface may be provided to allow the user to verify the content of the task, notepad page, or appointment before storing that information in the task or notepad database. If the user selects "create a contact," however, additional modification to the electronic information may be allowed prior to allocating that electronic information into a record associated with a contact database within the electronic address book program.

According to this embodiment, upon selection of the "create a contact" option, electronic information parsing module 36 parses the selected electronic information from electronic information selection module 32 into predetermined fields corresponding to those fields in a record in the electronic address book database into which the electronic information is to be stored. Electronic information parsing module 36 parses the selected electronic information into an array of field values as described above with respect to FIG. 1. Users may select the database into which addresses are to be placed through electronic information-to-database initiation module 34 or some other module within computer system 12. The record format for the database selected may therefore be used by electronic information parsing module 36 for allocating information into fields of that record format.

Electronic information parsing module 36 may comprise one or more modules that each perform separate functions such as depicted in FIG. 3. Electronic information parsing module 36 may comprise an array generation module 300, a recognized field extraction module 302, a text separation module 304, an electronic mail extraction module 306, a labeled value extraction module 308, a name parsing module 310, and a remaining field allocation module 312. These modules may operate as described above with reference to FIG. 1.

Figure 1:
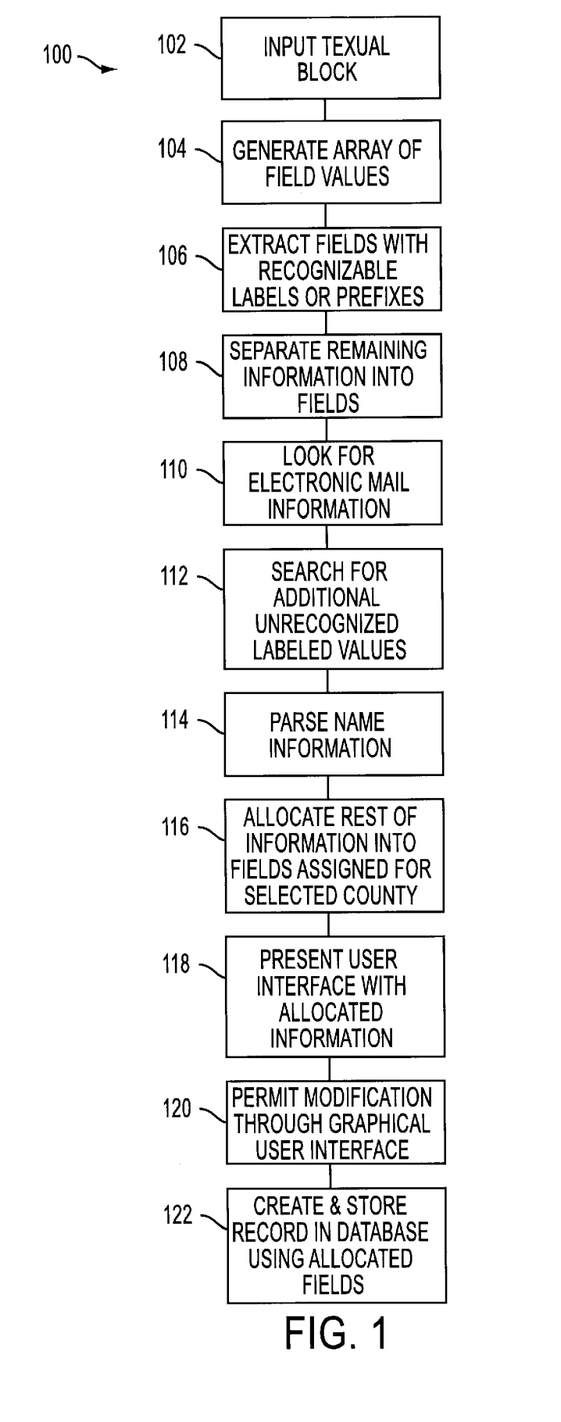
FIG. 1 depicts a flow diagram of a method according to one embodiment of the present invention.

Database verification module 38 may comprise any module that presents a graphical user interface to a user and may operate as described with respect to FIG. 1. Database storage module 40 may take the information provided and create or modify a record that may then be stored in a predetermined database usable by electronic address book interface module 28 to present contact information to a user. Preferably, database storage module 40 operates without requiring that the electronic address book interface module 28 be opened. Of course, electronic address book interface module 28 may be open while database storage module 40 stores the record or may store the record itself.

According to one embodiment, database storage module 40 may create a new record for the selected electronic contact information. Database storage module 40 may also retrieve an existing record and store the selected electronic contact information into the existing record. For example, database storage module 40 may search the database for matches in the selected contact information and retrieve a record having some common information with the selected contact information. A particular field, such as the name field, may be used to search from a record in the database. Further, data verification module 38 may present a user with the option of creating a new record or storing the selected information in an existing record. If the latter, the information that was stored for that record may be presented for a contact along with the newly selected information to permit the user to select which information to store in the database. Other options for enabling a user to choose between previously stored information for a contact and newly selected information may also be provided.

According to one embodiment of the present invention, several of the modules depicted within computer system 12 may be part of a clip and save contact module 42. Clip and save contact module 42 may comprise electronic information-to-database initiation module 34, electronic information parsing module 36, database verification module 38, and database storage module 40, for example. Accordingly, clip and save contact module 42 may operate on an operating system associated with user system 12 separately from electronic address book interface module 28. By providing a separate application module from electronic address book interface module 28, selected electronic information may be stored to a database associated with the electronic address book without having to open electronic address book interface module 28. Further, clip and save contact module 42 may utilize less memory relative to electronic address book interface module 28. Therefore, operation of clip and save contact module 42 rather than electronic address book interface module 28 provides savings in terms of memory and size in allowing a user to quickly and efficiently input contact information into an electronic address book database.

Further, clip and save contact module 42 may be provided on a computer readable storage medium and loaded onto user system 12. Other modules of user system 12 may also be provided on a computer readable storage medium.

Figure 4:
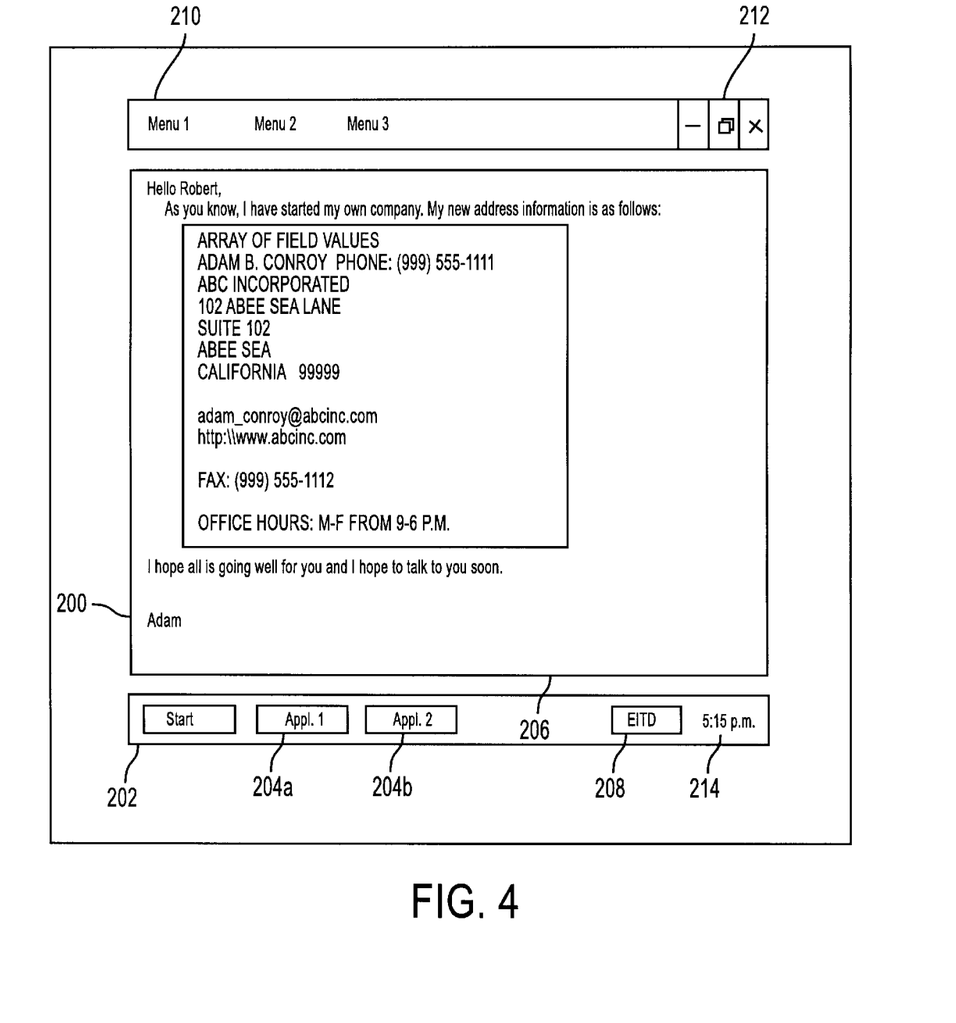
FIG. 4 depicts a computer graphical user interface system according to one embodiment of the present invention.

For purposes of illustrating an embodiment of the present invention, an example will be described. According to one embodiment of the present invention, as depicted in FIG. 4, a graphical user interface may be presented to the user on computer screen 200. The graphical user interface may comprise a task bar 202 presented along the bottom of computer screen 200 that comprises a plurality of application icons 204a and 204b that may be selected to activate a window for that application. Additional or fewer application icons 204 may also be provided. Task bar 202 may also comprise a clock 214 and a electronic information-to-database initiation icon 208. Computer screen 200 may also comprise a menu bar 210 comprising one or more window operation command icons 212. As depicted in FIG. 5, a textual display portion 206 may be presented on computer screen 200 as well. Textual display portion 206 may comprise a window or screen from an electronic mail package, a word processing program, or any other program presenting electronic information to a user on a computer screen 200.

According to an embodiment of the present invention, a user may select electronic contact information from within electronic information section 206 using electronic information selection module 32. The user may then initiate electronic information-to-database initiation module 34 by activation of electronic information-to-database initiation icon 208. Electronic information-to-database initiation icon 208 may be activated by clicking or some other method of activation, such as a drop operation. Electronic information parsing module 36 may then be initiated by electronic information-to-database initiation module 34 according to the present invention.

Figure 5A:
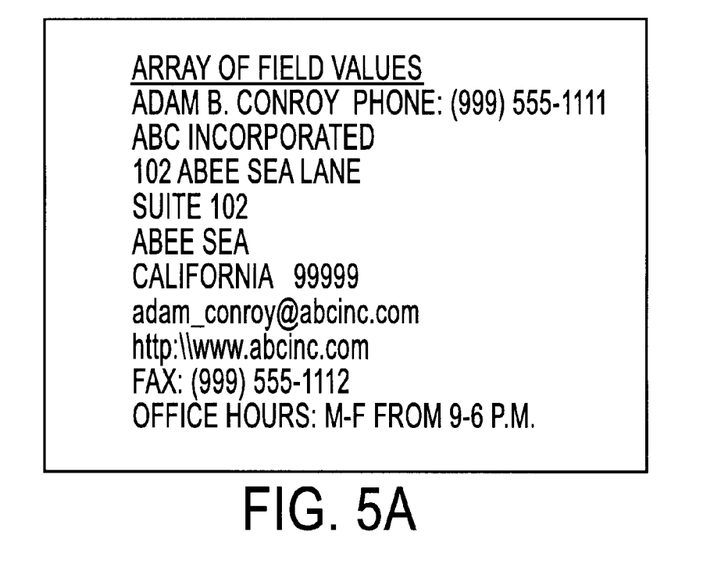
FIGS. 5(a)–(e) depict a sample selected electronic information block being parsed into fields according to one embodiment of the present invention.

In step 104, an array of field values is generated from the electronic information provided as depicted in FIG. 5(a). Each line in the array represents a separate field value. Next, in step 106, fields with recognizable labels or prefixes may be extracted from the general array of field values and placed into the recognized fields corresponding to the information.

Figure 5B:
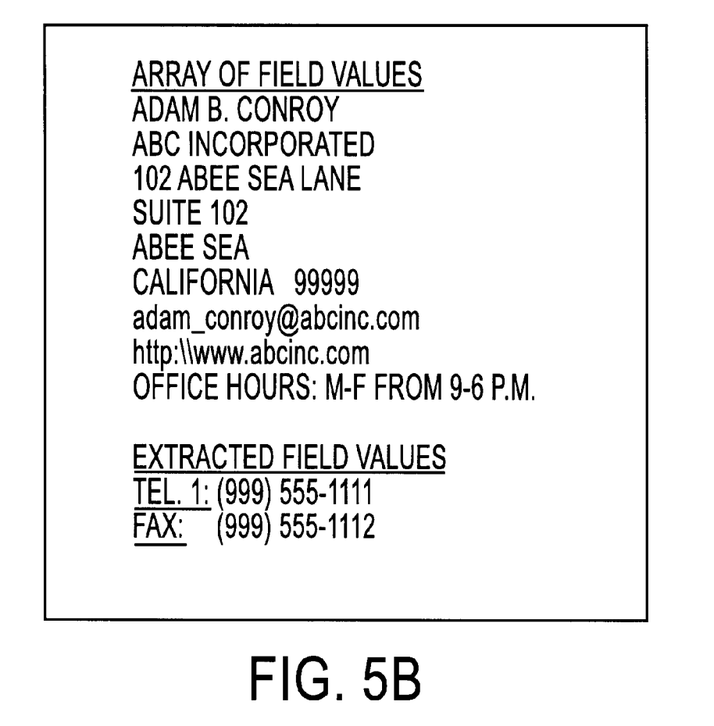

For example, in FIG. 5(a), the term "phone: (999) 555-1111" is depicted in the first field value. Upon recognition of the term phone, the entire phrase "phone: (999) 555-1111" may be extracted and placed in the telephone field entry as shown in FIG. 5(b). Similarly, the term "fax" may be recognized as a field label and, therefore, the entire phrase "fax: (999) 555-1112" may be extracted and placed in the fax field as shown in FIG. 5(b).

According to another embodiment of the present invention, if multiple telephone numbers are present in the text on the array of field values, the first number may be input into a tel.1 field and the second into a tel.2 field.

Figure 5C:
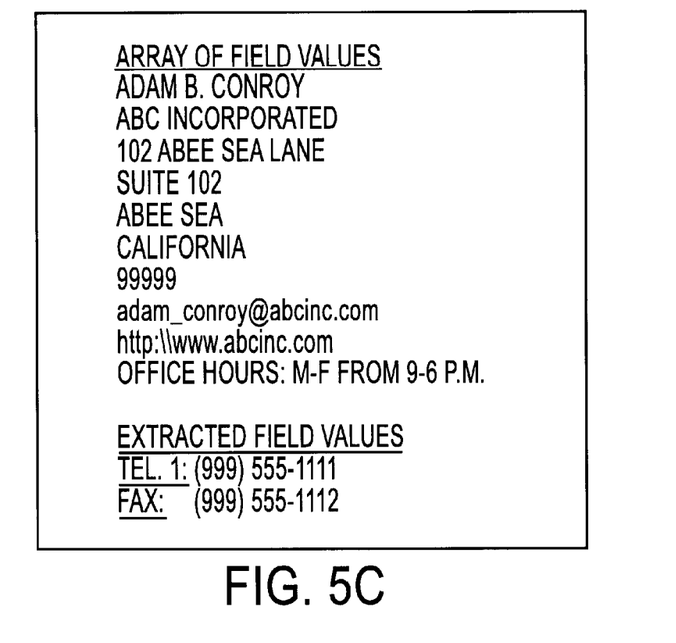
Figure 5D:
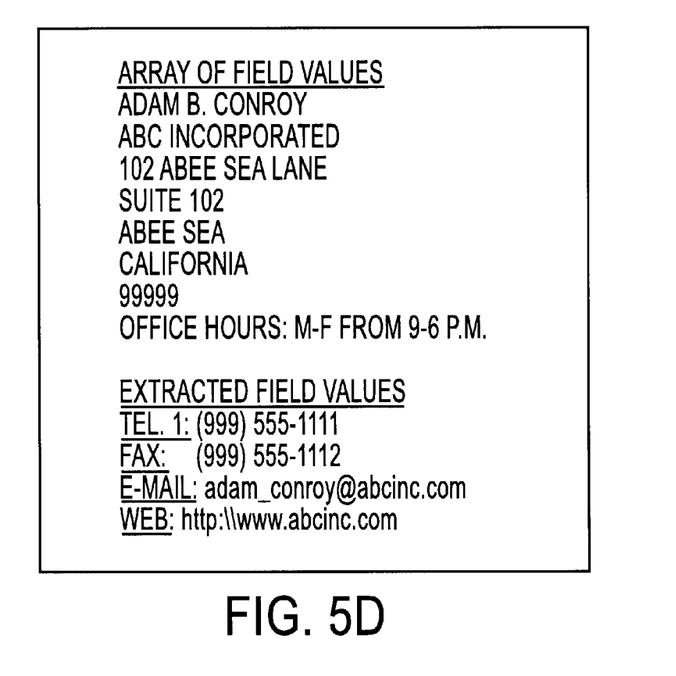
Figure 5E:
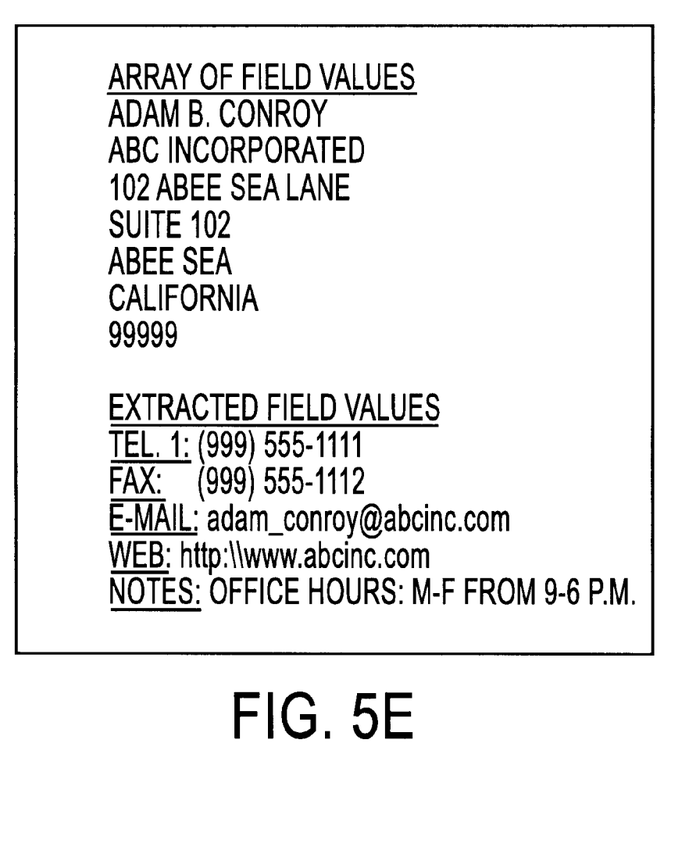

After extraction of recognizable labels or prefixes, in step 108 the remaining text may be further broken down into fields using additional rules. Accordingly, using the example in FIG. 5(b), the field "California (two spaces) 99999" may be further broken down into two fields of California and 99999 as depicted in FIG. 5(c). Next, in step 110, the electronic mail address and internet address may be extracted from the remaining array of field values. As depicted in FIG. 5(d), the electronic mail address and internet address may be placed in separate fields. Next, unrecognizable label values may be searched and extracted in step 112. According to one embodiment, the predefined field may be a "notes" field as depicted in FIG. 5(e) according to one embodiment of the present invention. In step 114, name information is then parsed into a predetermined order of the remaining fields of a record.

According to one embodiment of the present invention, an assumption is made that the name field is on the first line of the electronic information (for the United States and other country selections). In step 114, if another country selection is made, then in step 114, the name may be extracted from another line within the array of field values. According to that embodiment, the following method may be employed as described with respect to FIG. 6.

After name information has been parsed, the rest of the information is allocated into a field assigned for the selected country in step 116 as described above and as better understood with respect to FIG. 7. In step 118, a user interface with the allocated information may be presented to permit the user to verify or modify the information allocated to fields by the system. One embodiment of a user interface according to the present invention is depicted in FIG. 7. In step 120, modification may be made to the information provided. For example, a graphical user interface may be presented to enable the user to change information in any of the fields. One example of a graphical user interface is depicted in FIG. 7. Upon verification and completion of this information, in step 122, a record may be created and stored in the desired database associated with the electronic address book program or any other database which stores address information.

Figure 6:
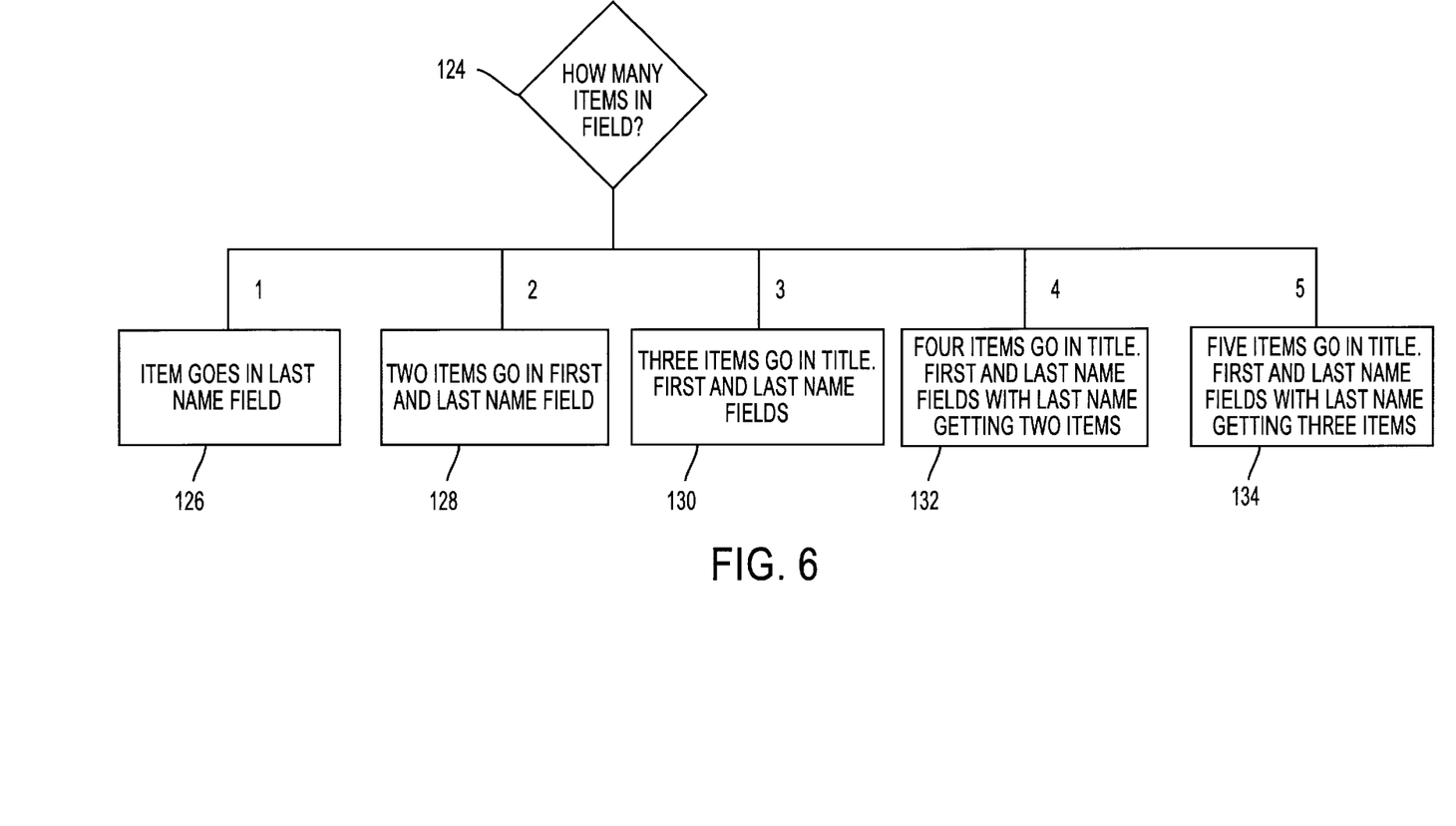
FIG. 6 depicts a flow diagram of a method of parsing a name field according to one embodiment of the present invention.

According to one embodiment, as depicted in FIG. 6, an algorithm for parsing name information into predefined fields may be provided. According to one embodiment, four predefined fields may be provided: title, first name, middle name and last name. It should be understood that other name fields may alternatively or additionally be provided, including a suffix field, for example. According to this embodiment, in step 124, electronic information parsing module 36 determines how many items are provided in the name field from the array of field values. The name field may be determined based on the country selected, as described below. If electronic information parsing module 36 determines that there is only one item in the name field, in step 126 that item is placed in the last name field. The number of items may be determined by looking for a space and counting the number of items separated by those spaces. If it is determined that there are two items in the field, those two items are placed in the first and last name fields in step 128. If it is determined that there are three items in the field, those items are placed in the title first and last name fields in step 130. If it is determined that there are four items in the field, the first item is placed in the title field, the second item is placed in the first name field, and the last two items are placed in the last name field in step 132. If it is determined that there are five items in the field, the first item is placed in the title field, the second item is placed in the first name field, and the last three items are placed in the last name field in step 134. According to this embodiment, a suffix may be provided by the database record and the fifth item may correspond to the suffix of the last name of the contact. Other methods of allocating name items into field values may also be used.

Further, the name field allocation method employed in step 114 may vary depending on the country selected by the user. Again, different countries have different name conventions and therefore step 114 may allocate names in correlation with the country name convention. For example, in some countries, the last or family name appears first. Therefore, in step 114, if that country is selected, the first item may be allocated to the last name.

FIG. 7 depicts a contact verification screen 50 according to one embodiment of the present invention. As depicted in FIG. 7, various sections of that screen may be provided, including an extracted field portion 52, name and address portion 54, an instructions portion 56, a format selection portion 58, a create selection portion 60, a street field selection portion 62, verification button 64, cancellation button 66, and a help button 68. According to one embodiment of the present invention, extracted field portion 52 may comprise a portion of contact verification screen 50 in which information that was extracted from the array of field values in steps 106 and 112 may be presented. For example, extracted field portion 52 may comprise fields for work and home telephone numbers, facsimile numbers, email addresses, web page address and notes.

Other extracted fields may also be depicted in extracted field portion 52. Name and address information portion 54 may comprise fields displaying the remainder of the electronic information derived from the selected electronic contact information by the user. According to one embodiment of the present invention, that information may comprise title, first name, middle name, last name, suffix, job title, company, street, city, state, zip and country. As depicted in FIG. 7, the information from FIG. 5(e) remaining in the array of field values may be placed into corresponding values within name and address information portion 54 in step 116.

Specifically, name and address information portion 54 may comprise a plurality of lines similar to lines in a text editing program. Each line within name and address information portion 54 may correspond to a field of the database. As in FIG. 7, the first line may correspond to the title, the second line to the first name, etc. The system may place the information in the lines of name and address information portion 54 corresponding to the predetermined order assigned for the database and as reflected in FIG. 7.

If the user desires to modify the correspondence between the electronic information that has been extracted and the fields depicted for the database, database verification module 38 may enable the user to do so. According to one embodiment, name and address portion 54 may comprise an editable block that includes the portions of the information depicted within various lines of the editable block. The user may edit the electronic information within name and address portion 54 by, for example, cutting and pasting, inserting, deleting, return fields or any other edit function provided in current editing systems. A cursor may be provided for assisting the user in determining where to insert information. This system enables a user to be able to modify the content of the record without being limited to editing within a particular field of the database or requiring cutting and pasting to move information from field to field within the database. Accordingly, if the information assigned by the system is off by one line, the user can shift the entire information down to the appropriate line by entering a blank line above the presented information.

For example, in the example of FIG. 5 according to the method of FIG. 6, the system may place the name "Adam B. Conroy" into the first three lines of name and address portion 54. This would result in the following assignment: Title—Adam; First Name—B.; Middle Name—(blank) and Last Name—Conroy. Because this information is not accurate, the user may insert the cursor on the first line before the word "Adam," insert a return which then moves all of the name information down by one line. As such, the following assignment would be: Title—(blank); First Name—Adam; Middle Name—B. and Last Name—Conroy, as depicted in FIG. 7.

Because the correspondence of field names and lines does not change, the user may easily modify the information that corresponds to those field names by changing the position of the information within name and address portion 54. This provides a significant advantage over a system in which each field is a separate block.

According to another embodiment of the present invention, extracted information portion 52 may also comprise an editable block as described above with respect to name and address portion 54.

According to one embodiment of the present invention, however, address information in different parts of the world may differ. For example, in some countries, the country name may be the first line of an address and not the name of a company or the name of a street. Accordingly, a format selection portion 58 may be provided to enable the user to select the address format corresponding to the country for the address. Format selection portion 58 may comprise a pull-down menu, depicted in FIG. 7, or some other mechanism for enabling a user to select a country address format. Additionally, multiple address formats for the same country may be provided. According to the embodiment depicted in FIG. 7, the information provided may be selected to be the format of the United States of America, although other countries may also be provided as well. Each format provided in format selection portion 54 may provide different field names and/or different orders of field names.

Accordingly, the predetermined order of presentation of fields as corresponding to the various lines within name and address portion 54 may be different depending on the country format selected. For example, if the country format is selected as the United States, then the order of field names depicted in verification screen 50 may be as depicted in FIG. 7. If, however, another country is selected, the order of fields may be Last Name, Middle Name, First Name, Job Title, Company Name, Title, Country, Zip, State, and City. Each field name may be depicted as corresponding to lines within the editable block of name and address portion 54.

As depicted in FIG. 7, allocation of information into the name and address information portion 54 may not be correct. Accordingly, a user may modify the information in that portion by editing the text through deletion, typing, cutting and pasting, entering and other known editing techniques. This may be performed in step 118. When a user is satisfied with the entries, the user may then accept the entry and create a record through clicking or otherwise activating verification button 64. A help button 68 may be provided to provide help on the operation of clip and save module 42, for example. Contact verification screen 50 may comprise a create selection portion 60 for enabling a user to select the database or the section of the database into which the contact record should be created. Create selection portion 60 may comprise a pull-down menu or some other mechanism for allowing selection of a database. Additionally, a work/home selection portion 70 may be provided to enable the user to select whether the address being provided is a work or home address. Other selection portions may also be provided to enable a user to select other preferences regarding the system.

User system 12 may comprise, for example, a personal computer, a networked computer, portable electronic device, or any other computerized device. User system 12 may comprise a client system connected to a database structure over a network as in a client-server system. The network may comprise any communication network such as a wireless system or a wired system such as cable, telephone, fiber optics, lines or some other wired communication system. The modules of the present invention may be part of any type of system.

It should be understood that although multiple modules are described as being part of user system 12 such modules may also be independent of user system 12. Also, the function performed by several different modules as described herein may be performed by a single module. The functions described as being performed by a module may also be performed by multiple modules.

According to one specific embodiment, clip and save module 42 may comprise a module offered under the name EasyClip™ which operates with the electronic address book program licensed by Lotus Development Corporation under the name Lotus Organizer™. According to one embodiment, EasyClip™ and Lotus Organizer™ may be operating on a Windows™ operating system licensed by the Microsoft Corporation. EasyClip™ may present an icon in the program task bar in the Windows™ operating system. According to this embodiment, selecting of electronic information in any application running on the Windows™ operating system and clicking on an icon presented in the task bar of the Windows™ operating system may initiate creation of a new record for an assigned Lotus Organizer™ contact database automatically without the Lotus Organizer™ program being opened by the Windows™ operating system.

According to another embodiment, electronic address book interface module 28 may comprise other electronic address book programs, such as Lotus Notes™, Microsoft Rolodex™, Microsoft Outlook™, DayTimer™ and others. Each of these electronic address book programs may be operating on the Windows™ Operating Systems, for example. Other operating systems may also be used.

Other embodiments and uses of the present invention will be apparent to those skilled in the art from consideration of the specification and practice of the invention disclosed herein. The specification and examples should be considered exemplary only. The intended scope of the invention is only limited by the claims appended hereto.

What is claimed is:

1. A system for storing selected electronic contact information into a record of a contact database comprising:
    a selection module that permits a user to select electronic contact information;
    an initiation module that enables a user to initiate parsing of the selected electronic contact information into fields of a record for storage in the contact database;
    a parsing module that dynamically parses the electronic contact information and assigns the parsed portions to fields of a record for storage in the contact database;
    a storage module that stores the parsed electronic contact information in the assigned fields in a record of the contact database;
    a recognized field extraction module that extracts recognized portions of the selected electronic contact information and assigns the recognized portions to corresponding recognized fields from a record of the contact database;
    a remaining field assignment module that assigns the remaining selected electronic contact information into fields from the record of the contact database according to a predetermined order of assignment; and
    a field array generation module that generates an array of field values from the selected electronic contact information.

2. The system of claim 1 further comprising a verification module for enabling a user to choose to verify the assignment of electronic contact information to fields by the parsing module prior to storage of that electronic contact information into a record.

3. The system of claim 1 wherein the parsing module comprises:
    a recognized field extraction module that extracts recognized fields from the array of field values and assigns the recognized fields to fields of the record;
    an electronic mail extraction module that extracts electronic mail information from the array of field values and assigns the electronic mail information to an electronic mail field of the record;
    a labeled value extraction module that extracts labeled values from the array of field values and assigns the labeled values to corresponding fields in the record;
    a name parsing module that parses a name field value in the array of field values and assigns portions of the name field value to one or more name fields; and
    a remaining field assignment module that assigns other field values of the array of field values to fields for a record of the contact database.

4. The system of claim 1 wherein the user initiates the initiation module through a computer screen icon presented to the user by the system.

5. The system of claim 1 further comprising an electronic address book module that operates to present information stored in records in the contact database and wherein the system may create and store a record in the contact database without opening the electronic address book module.

6. A system for parsing electronic contact information into a record of a contact database comprising:
    selection means for enabling a user to select electronic contact information;
    initiation means for enabling a user to initiate parsing of the selected electronic contact information into a record for storage in the contact database;
    parsing means, responsive to the initiation means, for dynamically parsing the selected electronic contact information and assigning parsed portions to fields of a record of the contact database;
    storage means for storing the parsed portions of the selected electronic contact information in the assigned fields in a record in the contact database;
    field extraction means for extracting recognized information from the selected electronic contact information and assigning that information to recognized fields from a record of the contact database;
    remaining field assignment means for assigning other information of the selected electronic contact information to fields of a record of the contact database according to a predetermined order of assignment; and
    field array generation means for generating an array of field values from the selected electronic contact information.

7. The system of claim 6 further comprising verification means for enabling a user to verify the assignment of electronic contact information to fields provided by the parsing module prior to storage by the storage means.

8. The system of claim 6 wherein the parsing means comprises:
    recognized field extraction means for extracting recognized fields from the array of field values and assigning the recognized fields to fields of a record in the contact database;

electronic mail extraction means for extracting electronic mail information from the array of field values and assigning the electronic mail information to one or more electronic mail fields in the record;

labeled value extraction means for extracting labeled values from the array of field values and assigning the labeled values to one or more corresponding fields in the record;

name parsing means for parsing a name field value in the array of field values and assigning portions of the name field to one ore more name fields in the record; and remaining field assignment means for assigning the remaining fields to fields from the record of the contact database.

9. The system of claim 6 wherein the initiation means comprises a computer screen icon presented to the user by the system.

10. The system of claim 6 wherein the system has an electronic address book module stored on the system that, when opened, presents information stored in the records of the contact database and wherein the system may store a record in the contact database without opening the electronic address book module.

11. In a computer system comprising an electronic address book module that, when opened, presents information stored in records in the contact database, a method for parsing electronic contact information into a record stored in a contact database for the electronic address book module, the method comprising the steps of:

selecting electronic contact information using a selecting module;

dynamically parsing the electronic contact information and assigning portions to fields of a record for storage in the contact database using a parsing module;

storing a record from the assigned fields in the contact database using a storage module;

extracting recognized portions from the selected electronic contact information and assigning the recognized portions to corresponding fields from a record of the contact database using a recognized portions extraction module;

assigning other portions from the selected electronic contact information to fields of the record of the contact database according to a predetermined order of assignment using an assignment module; and generating an array of field values from the electronic contact information using a field array generation module.

12. The method of claim 11 further comprising the step of verifying the assignment of electronic contact information into fields provided by the parsing module.

13. The method of claim 11 wherein the steps of parsing and assigning comprise the steps of:

extracting recognized fields from the array of field values and assigning the recognized fields to corresponding fields of a record for the contact database;

extracting electronic mail information from the array of field values and assigning the electronic mail information to one or more electronic mail fields;

extracting labeled values from the array of field values and assigning the labeled values to correspond to labeled fields;

parsing a name field value in the array of field values into one or more name fields; and assigning additional field values into fields from the record of the contact database according to a predetermined order of assignment.

14. The method of claim 11 wherein the electronic address book module is not opened during any of the steps.

15. A computer usable medium having computer readable program code means embodied therein for enabling parsing of electronic contact information into a record stored in a contact database on a computer system comprising:

computer readable program code means for causing a computer to receive electronic contact information selected using a selection module that was presented on a computer screen by a user application program;

computer readable program code means for causing a computer to use a parsing module to dynamically parse the electronic contact information and assign portions to fields of a record for storage in the contact database;

computer readable program code means for causing a computer to use a storage module to store a record with the assigned fields in the contact database;

computer readable program code means for causing a computer to use a recognized portions extracting module to extract recognized portions from the selected electronic contact information and assign the recognized portions to corresponding fields from a record of the contact database;

computer readable program code means for causing a computer to use an assigning module to assign other portions of the selected electronic contact information to fields from the record of the contact database according to a predetermined order of assignment; and computer readable program code means for causing a computer to use a field array generation module to generate an array of field values from the electronic contact information.

16. The computer usable medium of claim 15 further comprising computer readable program code means for causing a computer to verify the assignment of electronic contact information into fields provided by the parsing module.

17. The computer usable medium of claim 15 wherein the computer readable program code means for causing a computer to parse comprises:

computer readable program code means for causing a computer to extract recognized fields from the array of field values and assign the recognized fields to corresponding fields of a record for the contact database;

computer readable program code means for causing a computer to extract electronic mail information from the array of field values and assign the electronic mail information to one or more electronic mail fields;

computer readable program code means for causing a computer to extract labeled values from the array of field values and assign the labeled values to corresponding labeled fields;

computer readable program code means for causing a computer to parse a name field value in the array of field values into one or more name fields; and computer readable program code means for causing a computer to assign other field values from the array of field values into fields from the record of the contact database according to a predetermined order of assignment.

* * * * *